United States Patent [19]

Yaniger

[11] Patent Number: 5,302,936
[45] Date of Patent: Apr. 12, 1994

[54] CONDUCTIVE PARTICULATE FORCE TRANSDUCER

[75] Inventor: Stuart I. Yaniger, Ventura, Calif.

[73] Assignee: Interlink Electronics, Inc., Camarillo, Calif.

[21] Appl. No.: 941,228

[22] Filed: Sep. 2, 1992

[51] Int. Cl.$^5$ .................................................. H01C 10/10
[52] U.S. Cl. .................................... 338/47; 338/99; 338/100; 338/111; 338/112; 252/502
[58] Field of Search ................. 388/114, 95, 47, 120, 388/122, 125, 100, 101, 111, 112, 115; 252/502, 503, 509, 510, 511, 513, 521

[56] References Cited

U.S. PATENT DOCUMENTS

| | | |
|---|---|---|
| 3,212,043 | 10/1965 | Johnson ................................ 338/20 |
| 3,806,471 | 4/1974 | Mitchell . |
| 4,017,697 | 4/1977 | Larson . |
| 4,163,204 | 7/1979 | Sado et al. . |
| 4,314,228 | 2/1982 | Eventoff . |
| 4,315,238 | 2/1982 | Eventoff . |
| 4,489,302 | 12/1984 | Eventoff . |
| 4,492,949 | 1/1985 | Peterson et al. . |
| 4,503,416 | 3/1985 | Kim . |
| 4,529,959 | 7/1985 | Ito et al. . |
| 4,739,299 | 8/1988 | Eventoff et al. . |
| 4,745,301 | 5/1988 | Michalchik .................... 338/99 X |
| 4,794,366 | 12/1988 | Sakamoto ....................... 338/114 |
| 4,996,511 | 2/1991 | Ohkawa et al. ................. 338/114 |

*Primary Examiner*—Marvin M. Lateef
*Attorney, Agent, or Firm*—Merchant, Gould, Smith, Edell, Welter & Schmidt

[57] ABSTRACT

A pressure transducer includes a base ply, a resistance ply disposed on the base ply and at least two spaced apart contacts juxtaposed in relation to the resistance ply whereby at least one of the contacts may be pressed against the surface of the resistance ply. The resistance ply is made by spraying or silk screening a mixture of resin resistive to electrical conduction and a conductive particulate and then curing the composition to form a thin resistance ply having a surface with a multiplicity of micro-protrusions formed by the conductive particulate. The ratio of conductive particulate to resin is such that the mean distance between microprotrusions is greater than about five time the size of the conductive particles. The particles are in the range of about 0.5 to 10 microns and the resin layer is about is 0.4 to 0.8 microns thick.

24 Claims, 1 Drawing Sheet

CONDUCTIVE PARTICULATE FORCE TRANSDUCER

BACKGROUND OF THE INVENTION

The present invention relates to pressure transducers and compositions for making pressure transducers and in particular to transducers having a variable resistance layer made from a composition of conductive particulate intermixed with a continuous matrix resistive resin which is applied in a thin layer to a surface and thereafter cured to form the resistance layer.

Pressure responsive transducers are known. For example, U.S. Pat. No. 3,806,471 to Mitchell describes a typical pressure transducer wherein conduction paths through a volume of a thick compressible layer would be increased thereby decreasing the resistance through the layer in response to application of an external force. These volume type pressure transducers are subject to many disadvantages including the size of the transducer and the relatively rapid degeneration in performance with time and use.

An improved pressure transducer relying on variable contacts across the surface of a thin layer is disclosed in Eventoff U.S. Pat. Nos. 4,489,302 and 4,314,227. However, the Eventoff patents taught that the particulate was an insulative or semiconductor particulate which was believed necessary to insure there would be a resistance across the layer and that the resistance would vary in response to pressure. As such, the Eventoff patents taught away from the use of a conductive particulate. However, it has been discovered that a conductive particulate such as iron spheres or germanium can be used to form an effective pressure transducer when the particulate size and spacing in the resistive resin layer is selected, relative to the thickness of the resin layer, to be within certain ranges.

Accordingly, the pressure transducer of the present invention is made by applying a composition comprising a mixture of a resistive resin and a conductive particulate such as iron spheres or germanium. The resistive resin may be a carbon filled resin which conducts but has a resistance to conductance. The composition is disposed on a base ply to form a resistance layer where the mean spacing between conductive particles creating microprotrusion across the surface of the resistance layer, is greater than about five times the diameter of the particulate and the particle diameter is about 1.3 to three times the thickness of the resultant layer of resistive resin.

The present invention results in a pressure transducer which has stable, predictable performance characteristics largely independent of manufacturing conditions and subsequent environmental changes permitting a significant reduction in the cost of manufacture and an cost effective means of meeting customer tolerances and specifications.

SUMMARY OF THE INVENTION

A pressure transducer includes a base ply, a resistance ply disposed on the base ply and at least two spaced apart contacts juxtaposed in relation to the resistance ply whereby at least one of the contacts may be pressed against the surface of the resistance ply. The resistance ply is made by spraying or silk screening a mixture of a resistive resin and a conductive particulate such as iron spheres or germanium. The resin and particulate mixture is applied in its liquid form over the surface of a base ply and is thereafter cured to form a solid resistance ply having a surface with a multiplicity of microprotrusions formed by the conductive particulate.

The resistive resin may include a non-conductive resin mixed with molecular size carbon particulate. The carbon particulate is substantially smaller in size than the conductive particulate. The conductive particulate has a size in the range of about 0.5 to 10 microns and a concentration in the resin such that the mean distance between particles forming the microprotrusions in the resistance ply will be greater than about five times the conductive particle diameter.

BRIEF DESCRIPTIONS OF THE DRAWINGS

A complete understanding of the present invention and of the above and other objects and advantages thereof may be gained from a consideration of the following description of the preferred embodiments taken into conjunction with the accompanied drawings in which.

DETAILED DESCRIPTION

Figure 1:
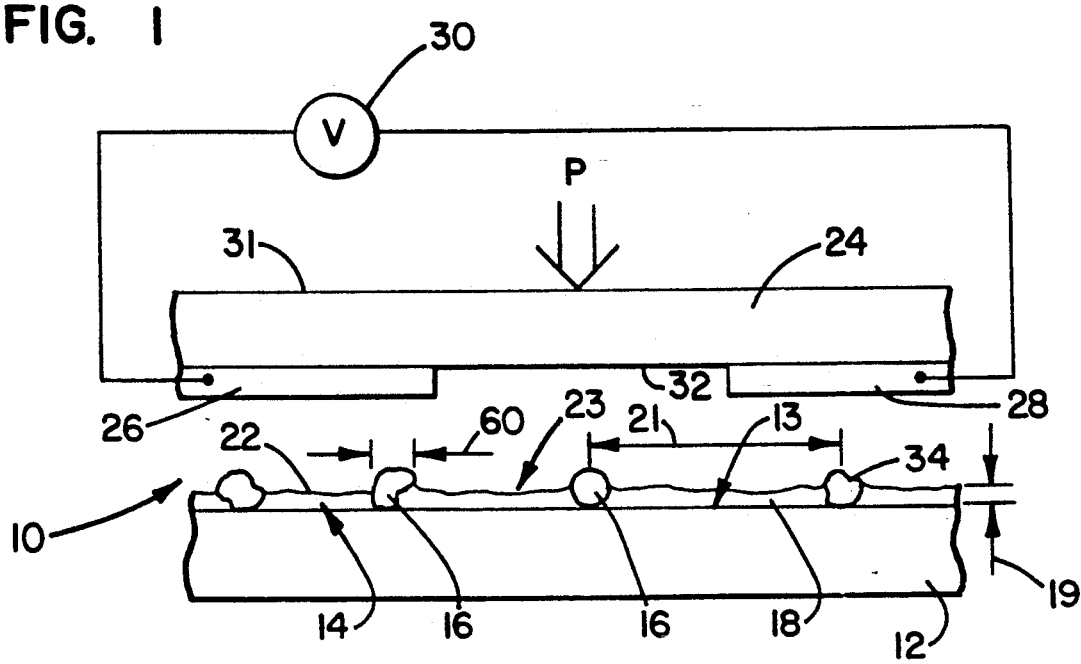
FIG. 1 is a side view of a pressure transducer having a conductive particulate resistance ply shown in exaggerated form to illustrate the present invention.

Referring to FIG. 1, a pressure transducer 10 characterized by a resistance which varies in response to the amount of pressure applied to the transducer includes a base ply 12 which may be any support material such as plastic, Mylar TM or any other suitable nonconductive material and may be either rigid, semi-rigid, or flexible. A resistance ply 14 is disposed on one surface 13 of the base ply 12 to provide the functional element of the transducer 10. The resistance ply 14, illustrated in exaggerated form in FIG. 1, includes a conductive particulate 16 intermixed in a resin layer 18 which is characterized by measurable electrical resistance. The particulate and resin are initially formulated as a liquid which is applied so as to adhere to the surface 13 of the base ply 12. The resistive resin layer 18 may be made of any suitable type of resin readily available on the market such as Acheson 423 resin or Olin Hunt 205A resin. Each of these resins comprises a mixture of non-conductive (insulative) resin base and a carbon particulate preferably of molecular size but in any event substantially smaller than the particulate size of the conductive particulate 16 so as to form a continuous matrix of the carbon in the resin when compared with the conductive particulate 16.

In the preferred embodiment, the conductive particulate 16 has a particulate diameter 60 in the range of about 0.5 to 10 microns so as to be in the range of about 1.3 to 3.0 times the thickness 19 of the resin layer 18. Accordingly the resin layer thickness 19 will be in the range of about 0.4 to 0.8 microns. When embedded in the resin layer 18, the conductive particulate 16 provides a multiplicity of microprotrusions 34 across the surface 22 of the resistance ply 14 to provide electrical conducting contact points. Because the particles 16 are conductive, the mean distance 21 between microprotrusions 34 will be greater than about five times the diameter of the conductive particles to provide acceptable resistance variations in response to application of pressure P. To achieve the arrangement of conductive particulate 34 in the resin layer 18, the ratio of resin to conductive particulate in liquid form which is applied to form the resistance ply 14 is in the range of about twenty parts resin to one part conductive particulate to two parts resin to one part conductive particulate. The conductive particulate may be iron spheres or germanium. When the particulate is iron spheres, the weight ratio of resin to particulate is about ten-to-one while for germanium, the weight ratio of particulate to resin is about one-to-seven.

Juxtaposed opposite the surface 22 of the resistance ply 14 is a contact support ply 24 having a first surface 32 on which is disposed a first contact 26 and a second contact 28 which are electrically spaced from one another but positioned in facing relationship to the resistance ply surface 23. A power source 30 may be interconnected across the first contact 26 and the second contact 28 to permit conduction between the first and second contacts through the resistance ply 14.

In operation, pressure P applied to the top surface 31 of the contact support ply 24, causes the first contact 26 and the second contact 28 to press against the surface 23 of the resistance ply 14. The contacts 26 and 28 will come in contact with the resistance ply surface 23 at a number of contact points and hence conduction paths through the conductive particles 16 as well as through the resin layer 18 between the first contact 26 and the second contact 28. As the pressure P is increased, greater numbers and regions of contact between the first and second contacts 26 and 28 and the surface 22 of resin layer 18 and microprotrusions 34 are created resulting in a greater number of conduction paths through the resin 18 and microprotrusions 34 thereby causing the resistance across the resistance ply 14 to decrease. Thus, the resistance of the pressure transducer will vary inversely with the amount of pressure P applied to press the first and second contacts 26 and 28 into contact with the surface 23 of the resistance ply 14.

The particular embodiment illustrated in FIG. 1 is a shunt configuration including a resistance ply having a resistive resin in which a conductive particulate 16 is intermixed as above described.

Figure 2:
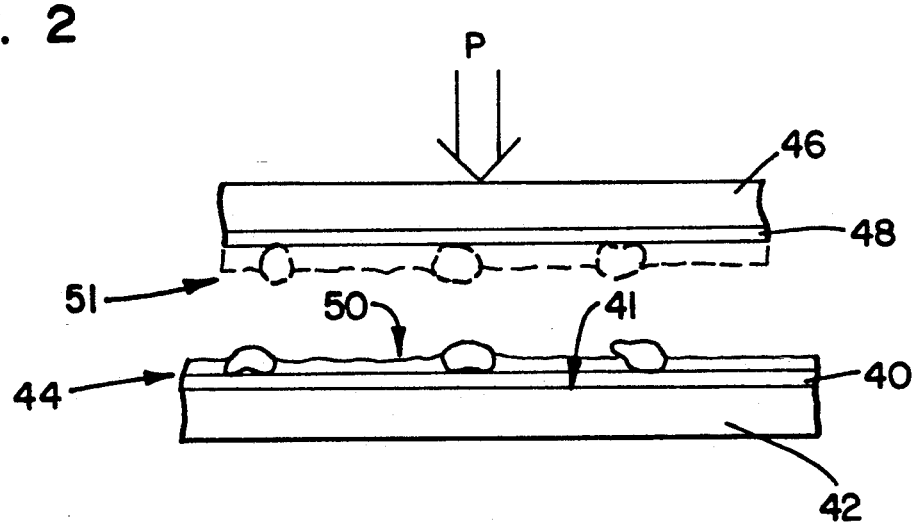
FIG. 2 is another embodiment of a pressure transducer wherein the contacts are positioned on opposite sides of the conductive particulate resistance ply.

Referring to FIG. 2, a "through" type pressure transducer device is illustrated wherein a first contact 40 is disposed on the surface 41 of base ply 42 with the resistance ply 44 of the type described in FIG. 1 applied across the surface 41 of the first contact 40. A contact support ply 46 supports a second contact 48 in a position opposite the surface 50 of the resistance ply 44. Accordingly, when a pressure P is applied to the contact support ply 46, the second contact 48 is pressed into contact against the surface 50 of the resistance ply 44. The increased surface contact causes increased conduction from the second conductor 48 through the resistance ply 44 to the first conductor 40 in proportion to the amount of pressure applied. Optionally, a second resistance ply 51 may be disposed on the second contact 48 in juxtaposition with the first resistance ply 44.

Heretofore, pressure transducers of the type relying on variable surface contact as set forth in Eventoff, U.S. Pat. Nos. 4,314,227 and 4,489,302, have included a semiconductive or insulative particulate mixed with a conductive resin. Pressure transducers made with a conductive particulate were not believed to provide variable surface contact resistance effect because the particles and the resin both would have conductive characteristics.

However, it was discovered that a composition of conductive particulate intermixed in the resin where the particulate was spaced apart and having the above described physical arrangement with the resistive resin ply provides an effective surface contact pressure transducer.

The composition from which the resistance ply 14 in FIG. 1 is made consists of a resistive resin in which is blended the conductive particulate. The particle size of the particulate is preferably in the range of about 0.5 to 10 microns although the size may vary without departing from the invention in its broadest aspects.

The resistive resin may be any suitable resin which conducts but has a resistance to conduction and may be a resin in which a carbon particulate is mixed. The size of the carbon particulate is substantially smaller than the conductive particulate and is preferably in the molecular size but in any event at least several orders of magnitude in size less than the conductive particulate so that the resin appears and acts as a continuous matrix resistive resin. The ratio of molecular carbon particulate to nonconductive resin of the resin may be 1 part carbon to 100 parts resin to about 25 parts carbon to 100 parts resin or any other suitable ratio which allows electricity to conduct through the resin. Preferably the blend of resin and particulate is such as to form a liquid which can be sprayed or silk screened onto the surface of the base ply either in a continuous layer or any suitable desired pattern. The resin with the particulate blended therein is applied by spraying, silk screening, or any other suitable method to the base ply so as to form the thin layer. The layer of the composition is thereafter cured by any suitable means consistent with the type of resin used such as heat, ultraviolet light, or the like to form the solidified resistance ply 14. The resistance ply 14 is thus permanently affixed and adhered to the one surface 13 of the base ply 12.

While the above described compositions and devices have been given to illustrate the invention and its preferred embodiments, many variations are possible without departing from the spirit from the present invention in its broadest aspects. Accordingly, the following claims are intended to set forth the invention in its fullest and broadest aspects.

What is claimed is:

1. A transducer having a resistance which varies in response to the amount of applied force comprising:
a base ply;
a resistance ply disposed on the base ply and having a resistance ply surface, the resistance ply comprising:
a resin resistive to electrical current passing therethrough, the resin forming a layer on the base ply, the resin layer having a first thickness and defining a resin surface; and
a conductive particulate interspersed in the resistive resin for forming a plurality of microprotrusions of the conductive particulate extending from the resin surface, wherein the ratio of resin to particulate is such that the mean distance between microprotrusions along the resistance ply surface is greater than about five times the particulate size;
at least two spaced apart contacts electrically interconnected across the resistance ply to enable electrical conduction through the resistance ply, at least one of the contacts juxtaposed opposite the surface of the resistance ply for being pressed theretoward, the resistance to electrical current conducting through the resistance ply varying in response to the amount of force applied to press the at least one contact toward the resistance ply surface.

2. The transducer of claim 1 wherein there are two contacts, both contacts being juxtaposed opposite the surface of the resistance ply, the resistance ply being electrically interconnected in shunt orientation across the two contacts.

3. The transducer of claim 1 wherein there are two contacts, one positioned on each side of the resistance ply whereby electrical current is conducted through the resistance ply.

4. The transducer of claim 1 wherein the resistive resin further comprises a non-conductive resin base and molecular sized carbon particulate mixed therein.

5. The transducer of claim 1 wherein the conductive particulate has a particle size in the range of about 0.5 to 10 microns.

6. The transducer of claim 1 wherein the ratio of resistive resin to conductive particulate is in the range of about 20 parts resin to 1 part conductive particulate to 2 parts resin to 1 part conductive particulate.

7. The transducer of claim 4 wherein weight ratio of carbon to non-conductive resin is in the range of one part carbon to one hundred parts non-conductive resin base to one part carbon to four parts non-conductive resin base.

8. The transducer of claim 1 wherein the particle size is in the range of 1.3 to 3 times the thickness of the resin layer.

9. The transducer of claim 1 wherein the thickness of the resin layer is in the range of about 0.4 to 0.8 microns.

10. The transducer of claim 1 wherein the particulate is iron spheres.

11. The transducer of claim 10 wherein the weight ratio of particulate to resin is about one to ten.

12. The transducer of claim 1 wherein the particulate is germanium.

13. The transducer of claim 12 wherein the weight ratio of particulate to resin is about one to seven.

14. A composition of matter for being disposed in a thin layer for forming a resistance ply juxtaposed between at least two contacts, the thin layer defining a surface against which at least one of the contacts may be pressed, the resistance ply having a resistance which varies in response to the amount of force with which the at least one contact is pressed against the surface of the resistance ply, the composition of matter comprising:
a resin which when applied in the thin layer is resistive to current passing therethrough; and 15. The composition of matter of claim 14 wherein the conductive particulate has a particulate size in the range of about 0.5 to 10 microns.

16. The composition of matter of claim 14 wherein the particulate is germanium.

17. The composition of matter of claim 16 wherein the weight ratio of particulate to resin is about one to seven.

18. The composition of matter of claim 14 wherein the ratio of resistive resin to conductive particulate is in the range of about 20 parts resin to 1 part conductive particulate to 2 parts resin to 1 part conductive particulate.

19. The composition of matter of claim 14 wherein the particulate is iron spheres.

20. The composition of matter of claim 19 wherein the weight ratio of particulate to resin is about one to ten.

21. The composition of matter of claim 20 wherein the conductive particulate has a particulate size in the range of about 0.5 to 10 microns.

22. The composition of matter of claim 20 wherein the ratio of resistive resin to conductive particulate is in the range of about 20 parts resin to 1 part conductive particulate to 1 parts resin to 1 parts conductive particulate.

23. A transducer having a resistance which varies in response to the amount of applied force comprising:
a first base ply;
a first contact disposed on the first base ply;
a second base ply in facing relationship to the first base ply;
a second contact disposed on the second base ply;
a first resistance ply disposed on the first contact and a second resistance ply disposed on the second contact and the first and second resistance plies comprising:
a resin resistive to electrical current passing therethrough, the resin forming a layer on the base ply, the resin layer having a first thickness and defining a resin surface; and
a conductive particulate interspersed in the resistive resin for forming a plurality of microprotrusions of the conductive particulate extending from the resin surface, wherein the ratio of resin to particulate is such that the mean distance between microprotrusions along the resistance ply surface is greater than about five time the particulate size;
the two contacts positioned to enable electrical conduction through the first and second resistance plies, the first and second resistance plies juxtaposed opposite each other for being pressed together, the resistance to electrical current conducting through the first and second resistance plies varying in response to the amount of force applied to press the surfaces of the first and second resistance plies together.

24. A composition of matter for being disposed in a thin layer for forming a resistance ply juxtaposed between at least two contacts, the thin layer defining a surface against which at least one of the contacts may be pressed, the resistance ply having a resistance which varies in response to the amount of force with which the at least one contact is pressed against the surface of the resistance ply, the composition of matter comprising:
a resin which when applied in the thin layer is resistive to current passing therethrough; and
a conductive particulate interspersed through the resin to form a multiplicity of microprotrusions extending from the surface of the thin resin layer, wherein the particle size is such as to be in the range of 1.3 to 3 times the thickness of the thin layer.

* * * * *

UNITED STATES PATENT AND TRADEMARK OFFICE
CERTIFICATE OF CORRECTION

PATENT NO.    : 5,302,936
DATED         : April 12, 1994
INVENTOR(S)   : Stuart I. Yaniger It is certified that error appears in the above-identified patent and that said Letters Patent is hereby corrected as shown below:

Column 5,
Line 53, insert -- a conductive particulate interspersed through the resin to form a multiplicity of microprotrusions extending from the surface of the thin resin layer, wherein the ratio of particulate in the resin for forming the thin layer is such that the mean distance between microprotrusions in the thin layer is greater than about five times the size of the particulate. --

Signed and Sealed this

Twenty-second Day of July, 2003

JAMES E. ROGAN
*Director of the United States Patent and Trademark Office*